(12) United States Patent
Olech

(10) Patent No.: US 11,260,930 B2
(45) Date of Patent: Mar. 1, 2022

(54) FOLDABLE BICYCLE FRAME

(71) Applicant: Grzegorz Olech, Warsaw (PL)

(72) Inventor: Grzegorz Olech, Warsaw (PL)

(*) Notice: Subject to any disclaimer, the term of this patent is extended or adjusted under 35 U.S.C. 154(b) by 201 days.

(21) Appl. No.: 16/793,170

(22) Filed: Feb. 18, 2020

(65) Prior Publication Data
US 2020/0262506 A1    Aug. 20, 2020

(30) Foreign Application Priority Data

Feb. 20, 2019    (EP) .................................... 19158391

(51) Int. Cl.
*B62K 15/00*    (2006.01)

(52) U.S. Cl.
CPC .................. *B62K 15/008* (2013.01)

(58) Field of Classification Search
CPC .............................. B62K 15/006; B62K 15/008
See application file for complete search history.

(56) References Cited

U.S. PATENT DOCUMENTS

| 6,135,478 | A | 10/2000 | Montague |
| 9,475,537 | B2 | 10/2016 | Hartmann |
| 2004/0178604 | A1 | 9/2004 | Ma |
| 2005/0121877 | A1 | 6/2005 | Groendal et al. |
| 2011/0148069 | A1 | 6/2011 | Ho |

FOREIGN PATENT DOCUMENTS

| CN | 204021140 U | * | 12/2014 | |
| CN | 208602621 U | * | 3/2019 | |
| DE | 10 2014 106971 A1 | | 11/2014 | |
| EP | 0 634 318 A1 | | 1/1995 | |
| EP | 2835307 A1 | * | 2/2015 | ........... B62K 15/006 |
| EP | 3 284 664 A1 | | 2/2018 | |
| EP | 3284664 B1 | * | 10/2018 | ........... B62K 15/008 |
| GB | 2475793 A | | 6/2011 | |
| PL | 232206 B1 | | 5/2019 | |
| WO | 2016/015073 A1 | | 2/2016 | |

OTHER PUBLICATIONS

Extended European Search Report in Application No. EP 19158391. 3, dated Aug. 14, 2019, 5 pgs.

* cited by examiner

*Primary Examiner* — Kevin Hurley
(74) *Attorney, Agent, or Firm* — Young Basile Hanlon & MacFarlane, P.C.

(57) ABSTRACT

A foldable bicycle frame includes a rigid element connecting a head with a seat tube, a rear section of the frame, a coupler, and an intermediate seat tube. The front upper part of the rear section of the frame is pivotally connected to the intermediate seat tube. The front bottom part of the rear section of the frame is pivotally connected to the coupler. The other end of the coupler is pivotally connected to the rigid element. The intermediate seat tube is operable to be inserted into the seat tube while unfolding the frame.

17 Claims, 7 Drawing Sheets

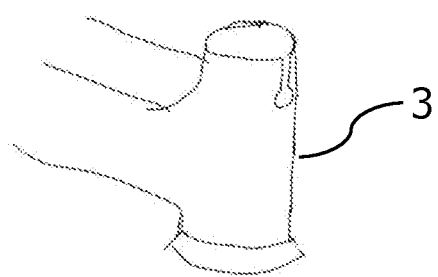
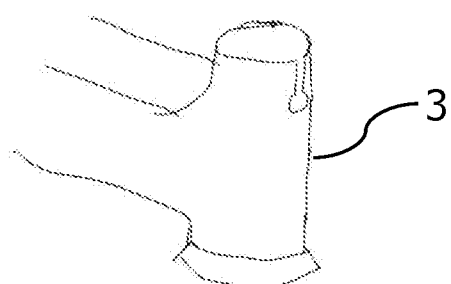
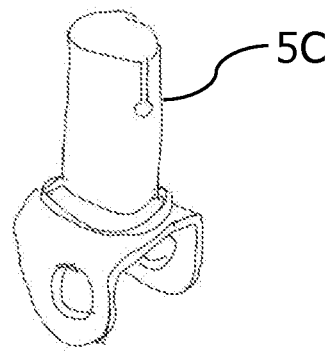
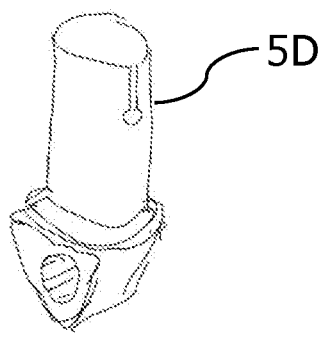
FIG. 10A  FIG. 10B
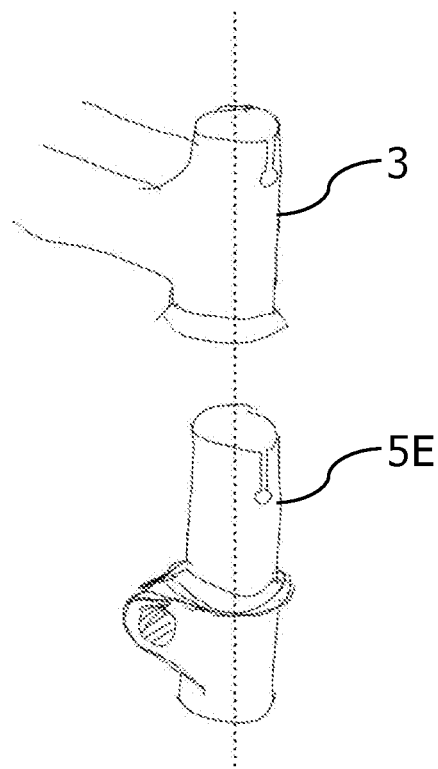
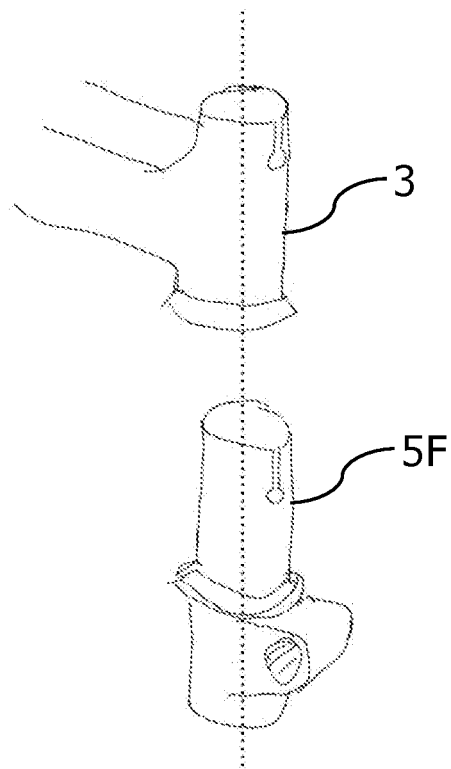
FIG. 11A  FIG. 11B

FOLDABLE BICYCLE FRAME

CROSS-REFERENCE TO RELATED APPLICATION

This application claims priority to European Application No. 19158391.3, filed on 20 Feb. 2019, which is incorporated herein in its entirety by reference.

FIELD OF THE DISCLOSURE

The present disclosure relates to a bicycle frame, in particular to a foldable bicycle frame.

BACKGROUND

Various types of foldable bicycle frames have been proposed. Some of them may be folded in a plane perpendicular to the longitudinal plane of the frame (so called horizontally foldable bicycles), while other types of foldable bicycles may be folded along the longitudinal plane of the frame (so called vertically foldable bicycles), usually by means of a hinge. Horizontal folding of the bicycle usually results in considerable thickness of the folded bicycle, especially when the rear wheel is placed next to the front wheel. These types of foldable bicycles require usually the use of small-sized wheels and thus hardly allow high speeds. There are also foldable bicycles with a detachable front wheel, which are usually more compact during storage.

US 2004/0178604 A1 describes an umbrella type foldable bike, which includes a bracket at the head tube to connect to a rising crossbar, another bracket at the seat stay to connect to the descending seat stay, where both of the crossbar and the seat stay expand outwardly by means of the brackets to constitute riding position or both of the seat pole and the seat stay are folded forwardly with the respective bracket as the support to facilitate storage or handling when the bike is not used.

US 2005/0121877 A1 describes a bicycle frame that incorporates a folding mechanism permitting the front and rear portions of the bike to be folded together for easy portability of the bike. A spring release locking mechanism is employed to hold the frame in an operating position until the frame is to be folded for transportation.

U.S. Pat. No. 9,475,537 describes a folding bicycle having a frame that extends in the main plane of extent, a front wheel that can be pivoted about a first axis that extends perpendicularly with respect to the main plane of extent, and a rear wheel that can be pivoted about a second axis that extends perpendicularly to the main plane of extent. The frame has a joint such that the front and rear wheel can be pivoted with respect to one another about a third axis that extends perpendicularly with respect to the roadway.

In Polish patent no. PL 232206 B1 (also published as DE 10 2014 106971 A1), there is described a foldable bicycle in its plane of symmetry, which can be folded to small dimensions, particularly to a small width. This can be achieved by using a hinge system in the central region of the frame, which allows folding of the bicycle in its frame plane. The foldable bicycle has at least two pivot points with axes of rotation perpendicular to the plane of the bicycle, which allow the bicycle to be folded so that the projection of the lower part of the fork of the front wheel after its removal as well as after making swings out about the axis of the pivot points within the projection contour of the rear wheel. It is important that, during the assembly of the bicycle, the elements of the rear wheel block do not change their position relative to each other.

WO2016/015073 A1 discloses a foldable bicycle frame comprising a seat tube for receiving a seat post, an upper tube, a head tube, a lower tube, two chain stays, and two saddle struts. A first detachable locking mechanism is provided in order to connect, in an unfolded state of the bicycle frame, the seat post, the seat tube, the upper tube, and the saddle struts rigidly and detachably to each other and to fix the position to each other.

BRIEF SUMMARY

For bicycle frames such as described above it is difficult to ascertain whether all foldable elements are secured in their desired positions during a ride. In some cases, in can be dangerous for a cyclist if a clamping mechanism between detachable elements loosens during a ride. It would be desirable to provide a foldable bicycle that is simple and easily unfolds into a secure position for a ride without requiring additional tools or excessive force.

A first aspect of the present disclosure provides a foldable bicycle frame that is folded essentially along a longitudinal plane of the bicycle frame and is equipped with an intermediate set tube being placed inside a seat tube during unfolding. The foldable bicycle frame has at least one dual-axis swivel that allows folding of the bicycle equipped with both front and rear wheels.

A second broad aspect of the present disclosure is to provide a foldable bicycle frame, which is folded along its longitudinal plane and is equipped with an intermediate seat tube being placed inside a seat tube during unfolding. The foldable bicycle frame according to this broad aspect can be folded into a small size with removal of the front wheel and without the need to remove the rear wheel.

A further aspect of the present disclosure is to provide a secure connection between a seat tube and a rear section of the frame, which connection is locked in an unfolded state and may be disconnected during folding. During unfolding, a seat post can be inserted together with an intermediate seat tube into the seat tube and locked into a secure and durable connection with a clamp. Optionally, the seat tube has a rear opening that allows placement of an insert, such as an insert for bike tolls, battery packs, as well as an insert in a form of a fender and/or a trunk.

In a further aspect of the disclosed foldable bicycle frames, a rear frame section may be pivotally connected in its upper part to an intermediate seat tube with a damper mount, to which a shock-absorber is connected. This may result in absorbance of vibrations during a ride.

Therefore, the present disclosure provides a foldable bicycle frame with a simple construction and a small number of additional parts, making the bicycle frame light and of general use.

BRIEF DESCRIPTION OF THE DRAWINGS

Embodiments of the present disclosure are described below with respect to the accompanying drawings, in which like reference numbers refer to like elements unless otherwise noted.

FIG. 10A shows an intermediate seat tube in a form of clevis.

FIG. 10B shows an intermediate seat tube in a form of tang.

FIG. 11A shows a mounting of an intermediate seat tube with a front opening.

FIG. 11B shows a mounting of an intermediate seat tube with a rear opening.

DETAILED DESCRIPTION

Figure 1:
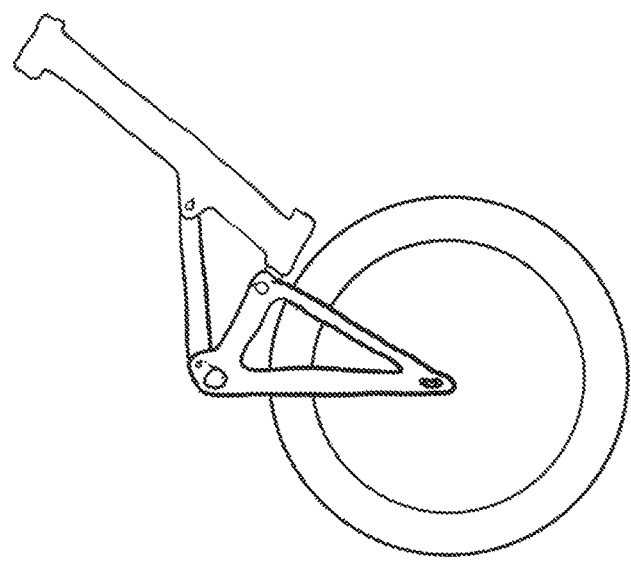
FIG. 1 shows a bicycle frame according to the teachings herein in an unfolded state.
Figure 2:
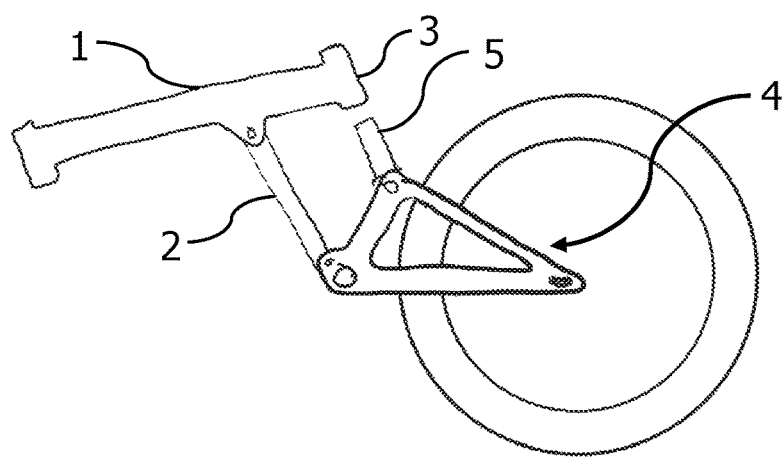
FIG. 2 shows a bicycle frame according to the teachings herein during unfolding.
Figure 3:
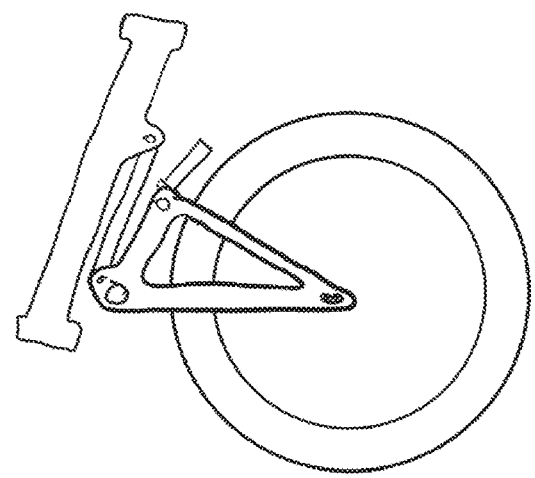
FIG. 3 shows a bicycle frame according to the teachings herein in a folded state.

Folding and unfolding of a foldable bicycle frame according to the teachings herein is illustrated using FIGS. 1-3. As shown, a foldable bicycle frame comprises a rigid element 1 (e.g., permanently) connecting a head with a seat tube 3, a rear section 4 of the frame, a coupler 2, and an intermediate seat tube 5. The front upper part of the rear section 4 of the frame is pivotally connected to the intermediate seat tube 5. The front bottom part of the rear section 4 of the frame is pivotally connected to the coupler 2, which on its other end is pivotally connected to the rigid element 1. The intermediate seat tube 5 is operable to be inserted into a seat tube 3 during unfolding. The intermediate seat tube 5 is operable to be removed from the seat tube 3 during folding. This is demonstrated by the sequence of FIGS. 1-3, where the unfolded state is shown in FIG. 1, unfolding or folding is shown in FIG. 2, and the folded state is shown in FIG. 3.

Figure 4:
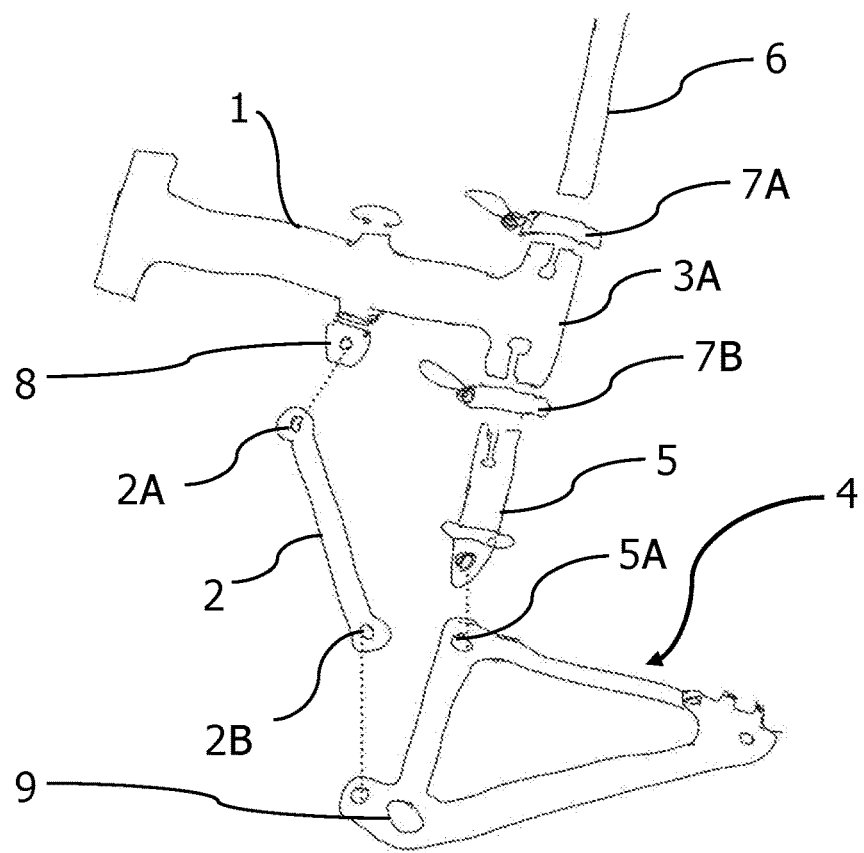
FIG. 4 shows an exploded view of a bicycle frame according to a first example.

As shown in FIG. 4, pivotal connections comprising openings 2A, 2B, and 5A are movable at least along the longitudinal plane of the bicycle frame. The longitudinal plane of the bicycle frame is perpendicular to the axis of rotation of the rear wheel. For the foldable bicycle frame described herein, at least one pivotal connection may have a form of a clevis fastener.

Figure 8:
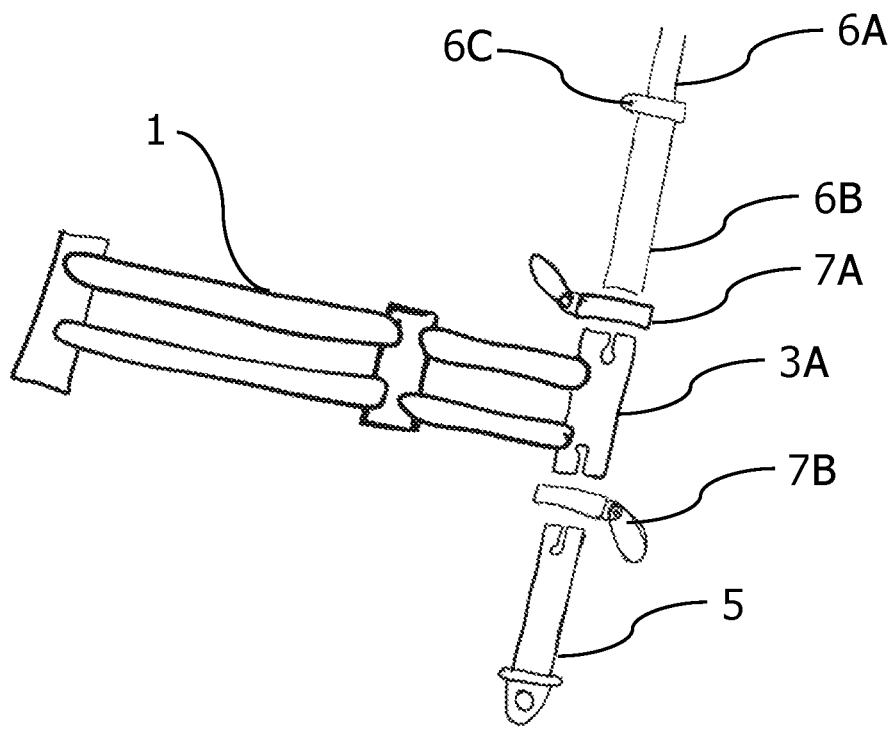
FIG. 8 shows an exploded view of the seat post connection.
Figure 9:
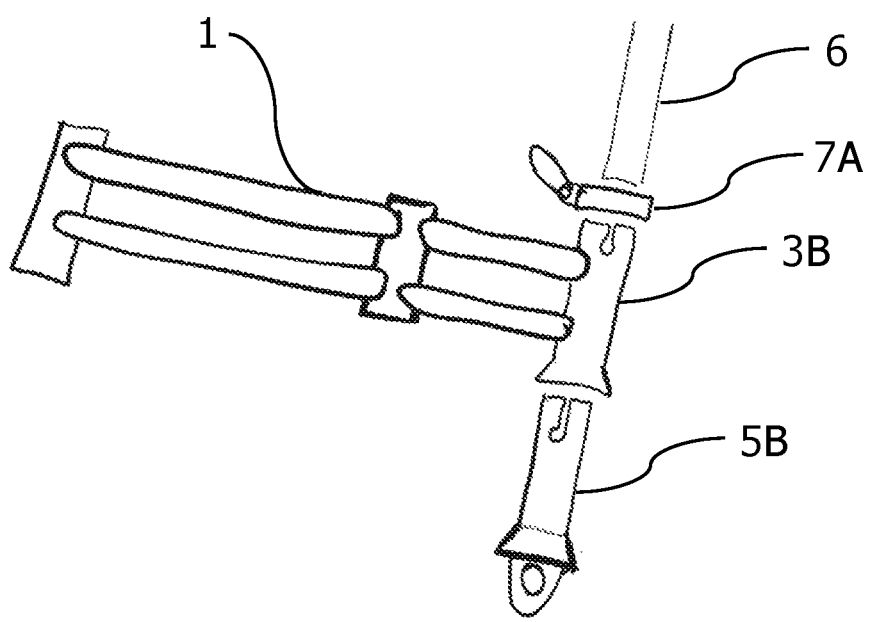
FIG. 9 shows an exploded view of the wedged type of connection.

The rigid element 1 is a central part of the bicycle frame and connects front and rear section of the bicycle. The rigid element 1 may be made from steel, aluminium, carbon fibre, composite material, or other suitable material or combination of materials known in the art. Light but durable construction of the rigid element 1 is preferable. The rigid element 1 may also have a form of a grid structure like a grid structure used in the Arantix and Ascend carbon frame by Delta 7 bikes. Preferably the rigid element 1 has a form of tube or profile and/or has a form of grid structure. More than one profile may be used in order to provide the rigid element 1, as illustrated in FIG. 8 and FIG. 9.

For the bicycle to work, construction of the front section of the bicycle is not essential, and a foldable bicycle frame according to the teachings herein works also without the front section. However, when the front section together with the front wheel is present, the disclosure herein allows folding of the bicycle with or without the removal of the front wheel depending on the type of pivotal connection between the rigid element 1 and the coupler 2. In order to fold the frame according to the present disclosure, there is no need to remove the rear wheel of the bicycle. For a ready to ride bicycle that is provided using a foldable frame according to the teachings herein, a front section of the bicycle typically comprises a front wheel, which is equipped with a fork connected with a frame using a head that may have a form of a head tube. A bicycle handlebar may be connected with a head via a stem, which is optionally equipped with a stem extension depending on the type of the bicycle.

As shown in FIG. 4, a cross-section of the intermediate seat tube 5 is smaller than a cross-section of the seat tube 3A, which allows placing the intermediate seat tube 5 inside the seat tube 3A. On the other hand, a cross-section of a seat post 6 is smaller than a cross-section of the intermediate seat tube 5, which allows placing the seat post 6 inside the intermediate seat tube 5. The resulting connection of the seat post 6, the seat tube 3A, and the intermediate seat tube 5 is locked by at least one clamp and preferably by two clamps, e.g., a clamp 7A at the top and a clamp 7B at the bottom of the seat tube 3A.

The seat post 6 is an optional element of the foldable bicycle frame, but it is generally needed to ride a bicycle after unfolding. A seat post in the form of tube is preferable, but not necessary. Optionally to allow adjustment of the height, the seat post may be made of two tubes, one smaller and one larger, wherein the tubes are inserted into each other and locked with a clamp. As depicted in FIG. 8, loosening of a clamp 6C allows elongation (adjustment) of the seat post, which is made of the first smaller tube 6A and the second larger tube 6B. The larger tube 6B is then secured by a clamp 7A together with the seat tube 3A, which is secured by a clamp 7B with the intermediate seat tube 5 after unfolding of the bicycle frame.

In a first embodiment, which is illustrated in FIG. 4, there is provided a foldable bicycle frame that is foldable essentially along a longitudinal plane of the bicycle without removal of the front wheel. A rigid element 1 is pivotally connected to a coupler 2 by a dual-axis swivel 8. The coupler 2 is connected from one end by a clevis pin and an opening 2B to the bottom part of the rear section 4 forming a movable connection along a longitudinal plane of the bicycle frame, and from the second end, the coupler 2 is connected by the opening 2A to the dual-axis swivel 8.

The dual-axis swivel 8 consists of a pivot having a first symmetry axis and clevis with ears, whose openings share the same second symmetry axis, wherein the dual-axis swivel 8 is connected via the pivot with the element for fixing the first axis of rotation of the dual-axis swivel 8 to the rigid element 1 and via the clevis with the coupler 2 for fixing the second axis of rotation of the dual-axis swivel 8. The first and second axes are perpendicular to each other. In this embodiment a preferable dual-axis swivel is the same as the one described in EP 3 284 664 A1. Any other dual-axis swivel that is movable not only along a longitudinal plane of the bicycle frame, but also in a plane that is perpendicular to the longitudinal plane of the bicycle frame, is appropriate for this embodiment. The dual-axis swivel 8 allows folding of the bicycle in a way that front and rear wheel are placed next to each other after folding.

Further, the intermediate seat tube 5 is being inserted during unfolding in the seat tube 3A. The clamps 7A and 7B allow secure locking of the intermediate seat tube 5 and the seat post 6 during a ride. Additionally, in this embodiment the removal of the front wheel before folding allows the steering wheel to be placed in the longitudinal plane of the bicycle frame.

Figure 5:
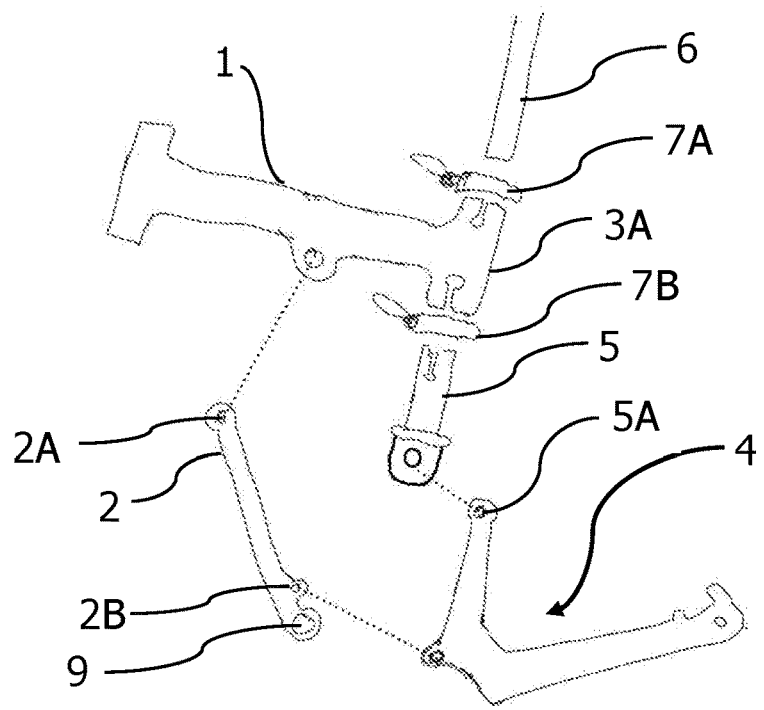
FIG. 5 shows an exploded view of a bicycle frame according to a second example.

In a second embodiment, there is provided a foldable bicycle frame that is foldable along a longitudinal plane of the bicycle after removal of the front wheel. In this embodiment, which is illustrated in FIG. 5, a foldable bicycle frame comprises three pivotal connections 2A, 2B, and 5A in a form of clevis fasteners. A clevis fastener is a three-piece fastener system consisting of a clevis (a U-shape part with openings on both ends), a clevis pin (that has a form of bolt), and a tang, which is placed inside the U-shape clevis. A clevis fastener allows the rotation of the elements connected to the clevis and tang along the plane that is perpendicular to the longitudinal axis of the clevis pin. The intermediate seat tube 5 is being inserted during unfolding in the seat tube 3A, which has two slots. The first slot at the bottom allow locking of the intermediate seat tube 5 via a clamp 7B. The second slot on the seat tube 3A enables mounting of the seat post 6 and locking in the unfolded state via a clamp 7A.

Figure 6:
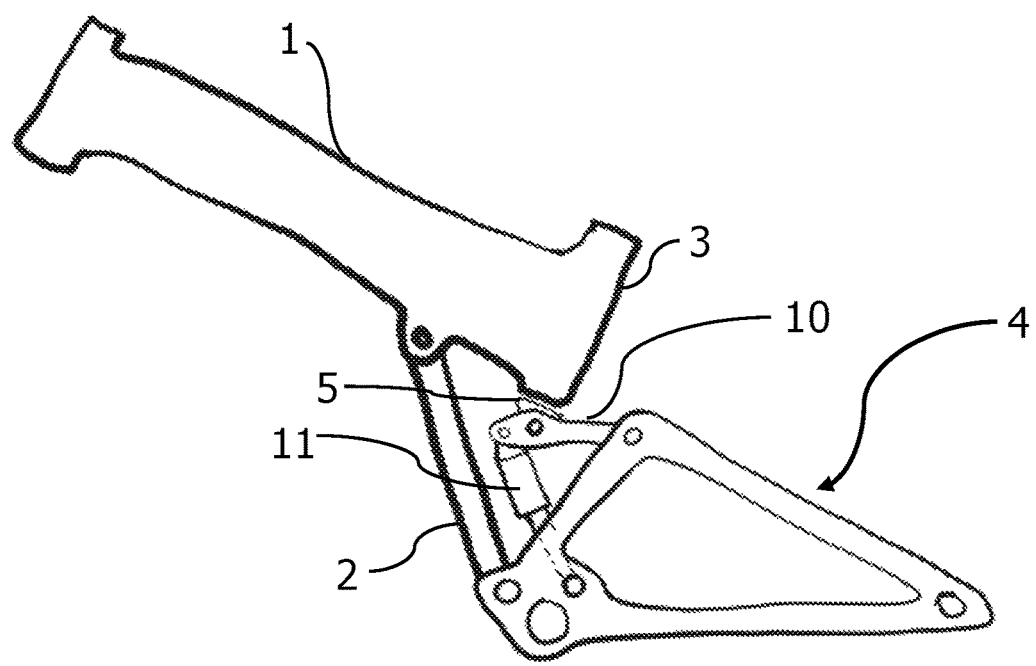
FIG. 6 shows a foldable bicycle frame according to a third example.

According to another embodiment, which is illustrated in FIG. 6, the upper part of the rear section 4 is pivotally connected to the intermediate seat tube 5 with a damper mount 10. The damper mount has three openings, one for connecting intermediate seat tube 5, the second for connecting the upper part of the rear section 4, and the third to connect an additional element. The damper mount may also have more or fewer openings. Preferably the additional element is a shock-absorber 11. Preferably the shock-absorber 11 is connected to the upper part of the rear section 4 by the damper mount 10. Most preferably the shock-absorber 11 is a gas-charged shock-absorber or a spring. In this embodiment, the shock-absorber 11 is connected to the damper mount 10 in the nearest position relative to the coupler 2.

Figure 7:
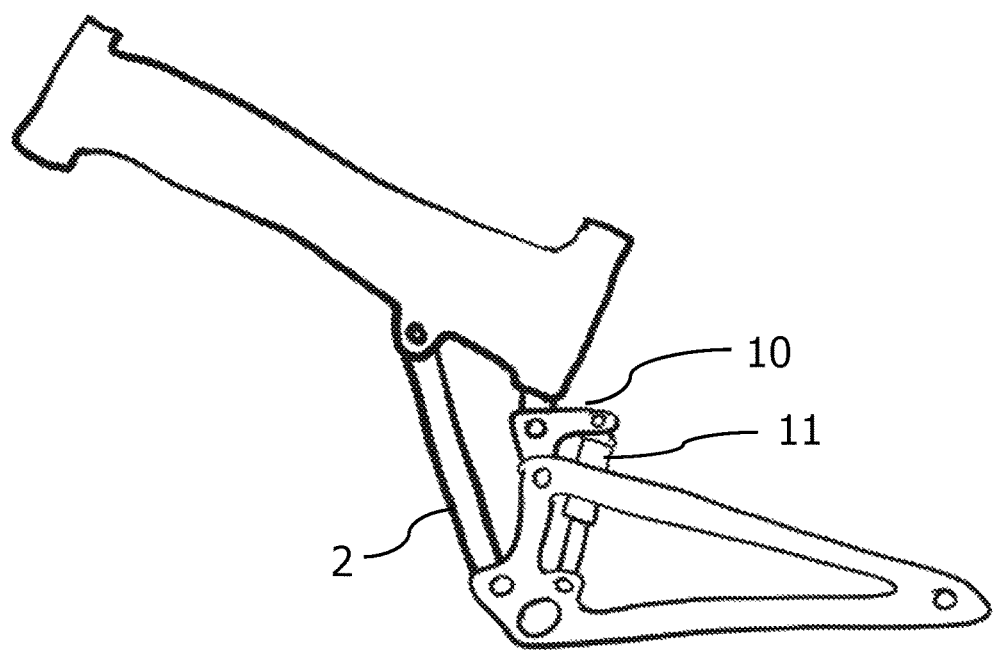
FIG. 7 shows a foldable bicycle frame according to a fourth example.

Another embodiment, which is illustrated in FIG. 7, is similar to the embodiment illustrated in FIG. 6, but the shock-absorber 11 is connected to the damper mount 10 as far as possible relative to the coupler 2.

The rear section 4 of the frame, also called a rear section 4, is a traditional rear section of a bicycle, which may be, e.g., in a form of a triangle, and is equipped with a bottom bracket. As shown in FIG. 4 the bottom bracket 9 is a part of the rear section 4. In the present embodiments, a bottom bracket 9 can be also included in a coupler 2 as shown in FIG. 5, and in that case a rear section 4 does not need to have a bottom bracket. As depicted in FIG. 5, the rear section 4 does not need to be in a form of closed triangle and is of a V-shape. The upper part of the rear section 4 may be made of any suitable material such as metal (e.g., steel, aluminium), metal alloys, carbon fibre, glass fibre, any combination thereof, or composite materials.

In some embodiments, as for example in FIG. 4, a rear section 4 is made of a rigid material that may be pre-tensioned in the upper part of the rear section 4, which pre-tensioning allows for greater resistance to deformation. An example of such materials is steel. In some of the embodiments a rear section 4 is made of two or more materials of different rigidity, such as composite materials. In preferred embodiments the material used in a rear section 4 is chosen from the group comprising steel, aluminium, glass fibre, any combination thereof, and composite materials. Other materials that are known by the person skilled in the art for the construction of bicycle frames are suitable to accomplish the foldable bicycle frame according to the disclosure herein. A rear wheel, which is connected to a rear section 4, and other traditional bike parts are needed in order to ride an unfolded bicycle, but these parts are optional for the foldable bicycle frame.

As shown by example in FIG. 9, the intermediate seat tube 5 may have a form of wedged intermediate seat tube 5B, which is operable to be inserted by a wedge type of connection into the seat tube 3 having a form of wedged seat tube 3B. Then, the wedged connection is secured with a clamp 7A. In this embodiment, the intermediate seat tube 5B has a form of a cone at the bottom and the seat tube 3B is appropriately matched to the shape of this cone. Any potential looseness is then eliminated after the top clamp 7A is locked.

As shown by example in FIG. 10A, the intermediate seat tube 5C may have a form tube with slot to mount a seat post on one end, and on the other end has a form of clevis with two openings for mounting a clevis pin.

As shown by example in FIG. 10B, the intermediate seat tube 5D may have a form of tube with slot to mount a seat post on one end, and on the other end has a form of tang with an opening for mounting a clevis pin.

In the examples of FIG. 11A and FIG. 11B, the intermediate seat tube 5E and/or 5F has an opening placed in the tang or in the clevis outside a longitudinal axis of the intermediate seat tube 5. This arrangement enables a connection with the rear section 4 near the coupler 2 for the intermediate seat tube 5E, as shown in FIG. 11A, or further from the coupler 2 for the intermediate seat tube 5F, as shown in FIG. 11B. The intermediate seat tube 5E and/or 5F has a through hole along its longitudinal axis, which allows, e.g., mounting a longer seat post or a deeper seating of the seat post. Preferably the through hole runs through the whole length of the intermediate seat tube 5E and/or 5F.

Figure 12:
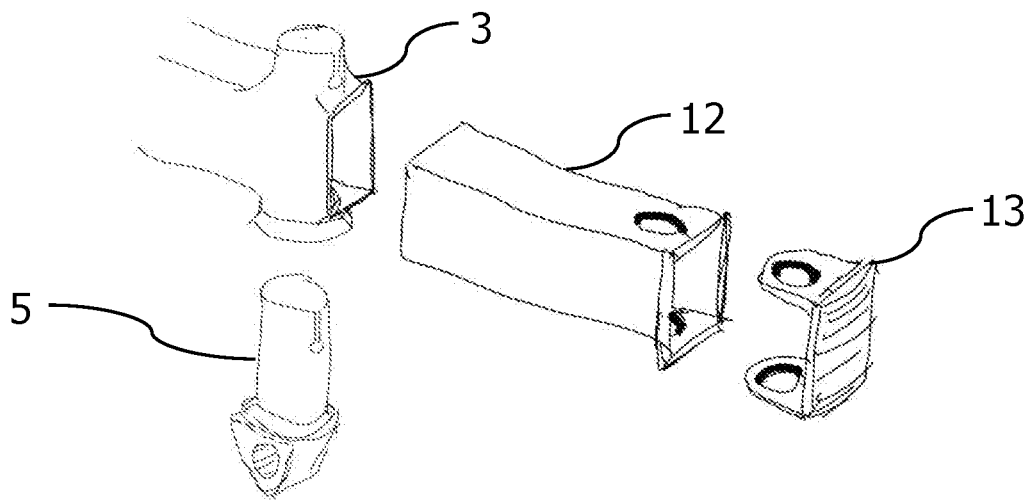
FIG. 12 shows a rear opening with an insert and a back wall.

As shown by example in FIG. 12, the seat tube 3 may have a rear opening to place an insert 12, wherein the insert 12 has two openings, one at the bottom and one at the top. The openings of the insert 12 have a cross-section larger than a cross-section of the intermediate seat tube 5, wherein the insert 12 is optionally equipped with a back wall 13 that has the same respective openings. That is, for example, the back wall 13 may have a surface that extends between first and second ends, and the first and second ends may have openings that align with the top and bottom openings of the insert 12. The seat tube 3 is partially open from the rear side, and the channel formed inside the seat tube 3 and a rigid element 1 allows a placement of the insert 12. Therefore, the insert 12 can be placed inside this channel and secured with the intermediate seat tube 5, which passes through the insert 12.

Figure 13:
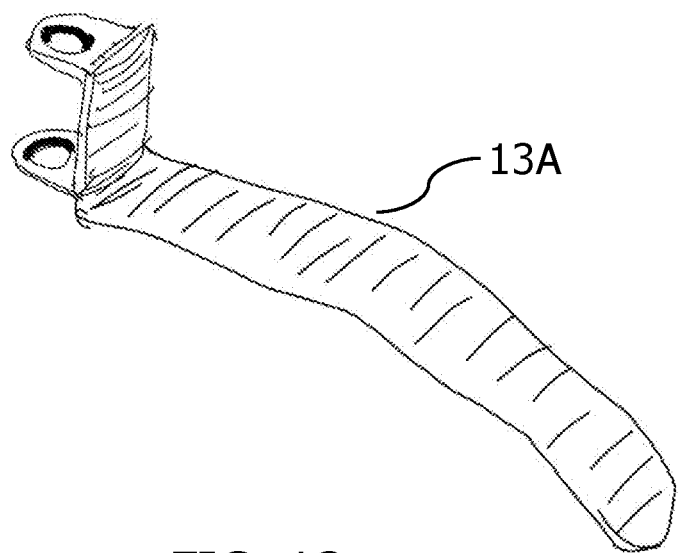
FIG. 13 shows a back wall in a form of fender.
Figure 14:
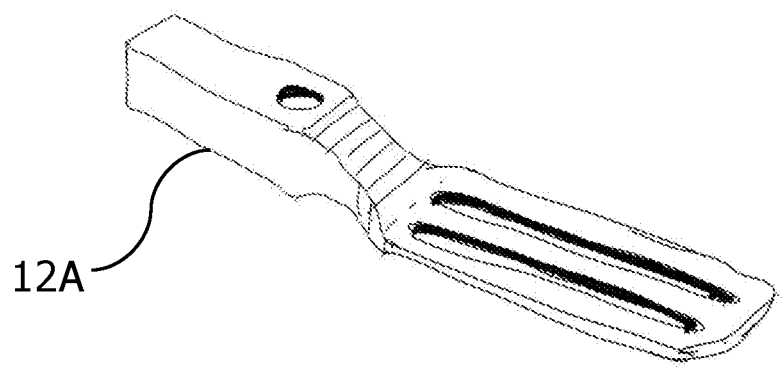
FIG. 14 shows an insert in a form of trunk.

In a preferred embodiment, the insert 12 is selected from an insert comprising a battery pack, an insert in a form of trunk 12A, as illustrated in FIG. 14, or an insert equipped with a back wall in a form of fender 13A, as illustrated in FIG. 13.

The battery pack can be any battery pack suitable for a bicycle, in particular for an electric bicycle. Lithium-ion rechargeable batteries (Li-Ion) or nickel-aluminium hydride rechargeable batteries (Ni-MH) are preferable. Such rechargeable batteries are useful for an electric bicycle that may be constructed based on the foldable bicycle frame according to the teachings herein.

Figure 15:
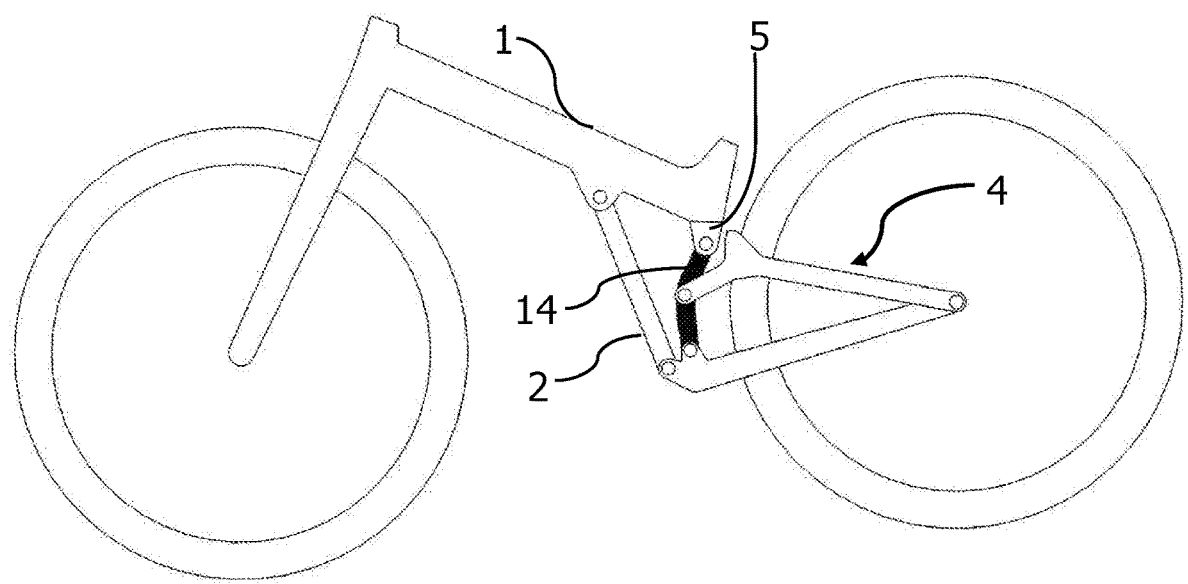
FIG. 15 shows a side view of a foldable bicycle frame with an elastic element.

In the side view of FIG. 15, a longitudinal plane of the frame lies in parallel with the sheet. As shown in FIG. 15, the rear section 4 of the frame may be connected to the intermediate seat tube 5 by an elastic element 14. The elastic element 14 minimizes vibrations during a ride. Preferably the elastic element 14 is made of glass fibre, and elements 1, 4, and 2 are made of a rigid material.

Figures 16A, 16B:
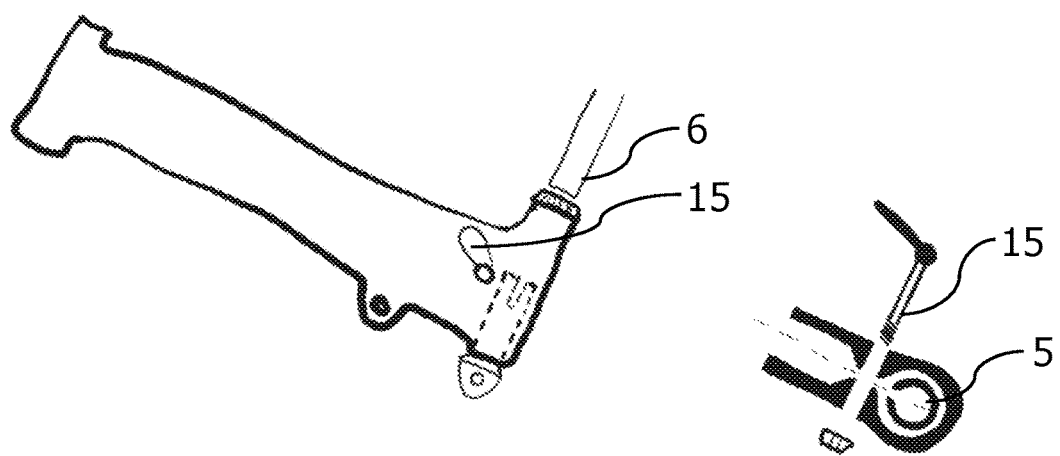
FIG. 16A shows a side view of the bicycle frame locked with a clamp.
FIG. 16B shows a view from above with a cross-section of the locking mechanism.

In the foldable bicycle frame according to the descriptions herein, clamps may be used in any suitable combination. In an embodiment as shown in FIG. 16A, a clamp 15 is installed across a rigid element 1. As shown in FIG. 16B, in the view from the top and cross-section, the clamp 15 consists of a screw with a butterfly and a nut. The clamp 15 squeezes the rigid element 1 over the intermediate seat tube 5 placed inside, which in turn tightens on a seat post 6 that allows secure connection of these elements during a ride.

Several examples of a foldable bicycle frame are described herein, along with variations. Certain examples are briefly summarized below.

A foldable bicycle frame as illustrated in FIG. 4 comprises a rigid element 1, which is permanently connected to a seat tube 3A with one slot at the bottom and one slot at the top. The foldable bicycle frame further comprises a rear section 4 in the shape of a triangle, a coupler 2, and an intermediate seat tube 5, which at the bottom has a form of tang with an opening to place a clevis pin. The intermediate seat tube 5 at the remaining upper part has a form of a tube with one slot. The bicycle frame is folded along a longitudinal plane of the bicycle, wherein a rear section 4 has an opening to mount a bottom bracket and is pivotally connected to the intermediate seat tube 5 by an opening 5A at the upper part of the rear section 4 and to the coupler 2 at the bottom part of the rear section 4 by the opening 2B. The coupler 2 is pivotally connected to a dual-axis swivel 8, which is in turn connected to the middle section of the rigid element 1. In an unfolded state, clamps 7A and 7B allow secure locking of the intermediate seat tube 5 and the seat post 6.

A foldable bicycle frame as illustrated in FIG. 5 comprises a rigid element 1, which is permanently connected to a seat tube 3A with one slot at the bottom and one slot at the top. The foldable bicycle frame further comprises a rear section 4, which is partially open at the top part, a coupler 2, which has a bottom bracket 9, and an intermediate seat tube 5, which at the bottom has a form of clevis with openings to place a clevis pin. The intermediate seat tube 5 at the remaining upper part has the form of a tube with one slot. The bicycle frame is folded along a longitudinal plane of the bicycle, wherein a rear section 4 in its upper part forms a tang, which is pivotally connected to the intermediate seat tube 5 by an opening 5A. The bottom part of the rear section 4 is pivotally connected to the coupler 2 by an opening 2B, wherein the coupler 2 is pivotally connected at its other end to the rigid element 1 by an opening 2A.

A foldable bicycle frame as illustrated in FIG. 6 comprises a rigid element 1, which is permanently connected to a seat tube 3. The foldable bicycle frame further comprises a rear section 4 in the shape of a triangle, a coupler 2, and an intermediate seat tube 5, which is being inserted inside the seat tube 3, which at the bottom is connected to a damper mount 10. The damper mount 10 has three openings, one for connecting the intermediate seat tube, the second for connecting the upper part of the rear section 4, and the third to connect the shock-absorber 11. The shock-absorber 11 is connected to the damper mount 10 in a (e.g., nearest possible) position relative to the coupler 2. The bicycle frame is folded along a longitudinal plane of the bicycle, wherein a rear section 4 is pivotally connected to the damper mount 10 by a first swivel. The bottom part of the rear section 4 is pivotally connected to the coupler 2 by a second swivel, and the coupler 2 is pivotally connected at its other end to the rigid element 1 by a third swivel.

A foldable bicycle frame as illustrated in FIG. 7 is similar to the foldable bicycle frame in FIG. 6, but it differs in that a shock-absorber 11 is mounted near a rear wheel. The bicycle frame comprises a rigid element 1, which is permanently connected to a seat tube 3. The foldable bicycle frame further comprises a rear section 4 in the shape of a triangle, a coupler 2, and an intermediate seat tube 5 inserted inside the seat tube 3, which at the bottom is connected to a damper mount 10. The damper mount 10 has three openings, one for connecting the intermediate seat tube, the second for connecting the upper part of the rear section 4, and the third to connect the shock-absorber 11. The shock-absorber 11 is connected to the damper mount 10 in a position as far as possible relative to the coupler 2. The bicycle frame is folded along a longitudinal plane of the bicycle, wherein a rear section 4 is pivotally connected to the damper mount 10 by a first swivel. The bottom part of the rear section 4 is pivotally connected to the coupler 2 by a second swivel, and the coupler 2 is pivotally connected at its other end to the rigid element 1 by a third swivel.

The embodiments and examples of the present disclosure are to be regarded in all respects as merely illustrative and not restrictive. Therefore, the present invention may be embodied in other specific forms without deviating from its essence, and is to be limited only by the scope of the claims.

What is claimed is:

1. A foldable bicycle frame, comprising:
   a rigid element connecting a head with a seat tube;
   a rear section having a front upper part and a front bottom part;
   a coupler having a first end and a second end; and
   an intermediate seat tube, wherein:
   the front upper part of the rear section is pivotally connected to the intermediate seat tube,
   the front bottom part of the rear section is pivotally connected to the first end of the coupler,
   the second end of the coupler is pivotally connected to the rigid element, and
   the intermediate seat tube is operable to be inserted into the seat tube while unfolding the foldable bicycle frame into an unfolded state that is arranged for riding.

2. The foldable bicycle frame according to claim 1, wherein pivotal connections at the first end and the second end are movable at least along a longitudinal plane of the bicycle frame.

3. The foldable bicycle frame according to claim 1, wherein at least one pivotal connection at the first end or at the second end has a form of a clevis fastener.

4. The foldable bicycle frame according to claim 1, wherein each pivotal connection at the first end and the second end is a clevis fastener.

5. The foldable bicycle frame according to claim 1, wherein:
   the intermediate seat tube has a form of a wedged intermediate seat tube,
   the seat tube has a form of wedged seat tube,
   a wedged connection is formed by inserting a wedge of the wedged intermediate seat tube into a wedge of the wedged seat tube, and
   the wedged connection is secured with a clamp.

6. The foldable bicycle frame according to claim 1, wherein the intermediate seat tube has a first end in a form of a tube with and slot for mounting inside the seat tube and a second end has a form of a clevis with two openings for mounting a clevis pin.

7. The foldable bicycle frame according to claim 1, wherein the intermediate seat tube has a first end with a form of a tube with a slot for mounting inside the seat tube and a second end with a form of a tang having an opening for mounting a clevis pin.

8. The foldable bicycle frame according to claim 1, wherein the intermediate seat tube has an opening through a tang or a clevis outside a longitudinal axis of the intermediate seat tube.

9. The foldable bicycle frame according to claim 1, wherein:
the seat tube has a rear opening to place an insert,
the insert has a bottom opening and a top opening, and
each of the bottom opening and the top opening has a cross-section larger than a cross-section of the intermediate seat tube.

10. The foldable bicycle frame according to claim 9, wherein:
the insert is equipped with a back wall having a first end and a second end,
the first end of the back wall has a first opening aligned with the bottom opening of the insert, and
the second end of the back wall has a second opening aligned with the top opening of the insert.

11. The foldable bicycle frame according to claim 1, wherein:
the seat tube has a rear opening to place an insert,
the insert has a bottom opening and a top opening,
each of the bottom opening and the top opening has a cross-section larger than a cross-section of the intermediate seat tube, and
the insert comprises one of an insert comprising a battery pack, an insert in a form of a trunk, or an insert equipped with a back wall and a form of a fender, which is secured to the seat tube using at least one of the bottom opening or the top opening.

12. The foldable bicycle frame according to claim 11, wherein:
the back wall has a first end, a second end, and a surface extending therebetween,
the surface extends over the rear opening,
the first end of the back wall has a first opening aligned with the bottom opening, and
the second end of the back wall has a second opening aligned with the top opening.

13. The foldable bicycle frame according to claim 1, wherein the rear section is connected to the intermediate seat tube by an elastic element.

14. The foldable bicycle frame according to claim 1, wherein at least one of the rigid element is made of at least one profile or the rigid element has a form of a grid structure.

15. A foldable bicycle frame, comprising:
a rigid element connecting a head with a seat tube;
a rear section having a front upper part and a front bottom part;
a coupler having a first end and a second end; and
an intermediate seat tube, wherein:
the front upper part of the rear section is pivotally connected to the intermediate seat tube,
the front bottom part of the rear section is pivotally connected to the first end of the coupler,
the second end of the coupler is pivotally connected to the rigid element by a swivel, and
the intermediate seat tube is operable to be inserted into the seat tube while unfolding the foldable bicycle frame into an unfolded state that is arranged for riding.

16. A foldable bicycle frame, comprising:
a rigid element connecting a head with a seat tube;
a rear section having a front upper part and a front bottom part;
a coupler having a first end and a second end; and
an intermediate seat tube, wherein:
the front upper part of the rear section is pivotally connected to the intermediate seat tube with a damper mount to which a shock-absorber is mounted,
the front bottom part of the rear section is pivotally connected to the first end of the coupler,
the second end of the coupler is pivotally connected to the rigid element, and
the intermediate seat tube is operable to be inserted into the seat tube while unfolding the foldable bicycle frame into an unfolded state that is arranged for riding.

17. The foldable bicycle frame according to claim 16, wherein the shock-absorber is a gas-charged shock-absorber or a spring.

* * * * *